H. BRAUN.
COUPON TRANSFER TICKET.
APPLICATION FILED SEPT. 16, 1911.
1,048,286.
Patented Dec. 24, 1912.

UNITED STATES PATENT OFFICE.

HENRY BRAUN, OF ELIZABETH, NEW JERSEY, ASSIGNOR OF ONE-THIRD TO FRANK J. PFAFF AND ONE-THIRD TO GEORGE SEEBER, BOTH OF ELIZABETH, NEW JERSEY.

COUPON TRANSFER-TICKET.

1,048,286. Specification of Letters Patent. Patented Dec. 24, 1912.

Application filed September 16, 1911. Serial No. 649,652.

*To all whom it may concern:*

Be it known that I, HENRY BRAUN, a citizen of the United States, and resident of the city of Elizabeth, county of Union, State of New Jersey, have invented certain new and useful Improvements in Coupon Transfer-Tickets, of which the following is a specification.

This invention relates to certain new and useful improvements in coupon transfer tickets, and more particularly improvements in what are termed "time limit transfers" for use on street railways and the like, for transferring passengers from the car of one line to the car of another line at a fixed transfer point and at a given time.

Another object of the invention is to make each transfer ticket a coupon having a redeemable value, said coupon serving as a receipt for the fare paid, the slip having means thereon whereby it may be destroyed as a transfer ticket when it is given as a coupon or mere receipt for the fare paid.

Another object of the invention is to provide a transfer ticket which if unused serves as a receipt for the fare paid and has a redeemable value so that it will not be destroyed by the passenger or given away to other prospective passengers.

Another object of the invention is to provide means by which the railroad company may keep an absolute check on the conductors. It is obvious that at the end of a run or at the end of a day the conductor must account for every coupon transfer ticket issued to him at the beginning of the day or at the beginning of the run by returning unused coupon transfer slips plus cash fares or transfers received, the whole equaling the entire number of coupon transfer tickets issued to the conductor. In the use of my invention, when a conductor receives a transfer he must issue for it to the passenger a coupon receipt so that the passenger will always have a receipt for the fare paid, said receipt being in the form of a redeemable coupon.

Another object of the invention is to print on each coupon transfer ticket an agreement by the company that a certain number of coupon transfers are redeemable for a certain number of tickets usable in the payment of fares so that each passenger will have a notice that his coupon receipt has a redeemable value in that a certain number of them may be exchanged for tickets receivable for car fares.

Another object of the invention is to provide a coupon transfer ticket without detachable slips or coupons so that it will be unnecessary for the conductor to tear off or detach any portion of the slip, said slips being converted into transfer slips or coupons only by punching them in certain designated places.

As transfer tickets are now constructed and used they are of no value except as transfers and if they are not used by a passenger for that purpose they are thrown away or otherwise destroyed. There is no means for determining the number of transfers received or issued by a conductor. It frequently happens that a person entitled to a transfer will accept it and then deliver it to another person who would otherwise pay the regular fare. In this way a railroad in the course of a day will lose many fares. By my system of coupon transfers the slip will have a redeemable value and if not used by the person entitled to it it will be preserved and eventually be presented for redemption by the railroad company.

By providing means whereby the coupon transfer ticket may be destroyed as a transfer and rendered solely as a receipt for the fare paid the frequent disputes between a conductor and passenger as to whether or not his fare has been paid will be avoided as each passenger will have a receipt for his fare which, under the terms of the receipt, he must show whenever requested to do so. Even a passenger presenting a transfer will receive in return a slip punched in such a manner as to convert it into a mere fare receipt coupon, so that all passengers will have a receipt for their fares, thereby rendering it extremely unlikely that any question should ever arise as to whether or not a passenger had paid his fare or delivered his transfer to the conductor.

The fact that the conductors must account for every coupon transfer ticket delivered to them, will make it impossible for them to exchange transfers as they now so frequently do. A conductor cannot part with a transfer slip without accounting for it either by a cash fare or a received transfer so that if transfers are exchanged one conductor or the other must account for his transfers by turning in cash fares, or the exchange of coupons will be detected.

In the drawing Figure 1 is an elevation of the back of the coupon transfer ticket; and Fig. 2 a similar view of the face of the ticket.

Referring to the drawings by reference numerals, 1 designates the coupon transfer ticket, which consists of a strip of suitable material divided on its back into a body portion 2 and an antemeridian coupon 3 and a postmeridian coupon 4, these coupons being at one end of the ticket and divided from each other by means of a line 5. The antemeridian coupon bears the legend "Valid for A. M. only when punched" so that it becomes necessary to punch the said antemeridian coupon in order to make the transfer valid as an a. m. transfer. The postmeridian coupon bears the legend "Not valid for P. M. if punched" so that it becomes unnecessary to punch either coupon if the ticket is to be used as a p. m. transfer.

The body portion of the ticket on its back and near its upper edge bears the words "Coupon No." followed by a suitable number. Below the word "Coupon" the back of the ticket bears an agreement of the company that a certain number of the transfers when issued are redeemable for a certain number of free tickets which may be used as fares. The ticket also bears a statement that the coupon transfer is a receipt for the fare paid and requesting the passenger to show the receipt whenever necessary. Below this agreement and statement the ticket bears the date upon which the transfer is issued and also ruled-off spaces to be punched for first fare and second fare when the coupon is used on a two-fare line. At the right end of the ticket is a blank space 6 wherein the ticket is punched if it is not to be used as a transfer, and when punched at this point the transfer character of the ticket is destroyed and it is good merely as a receipt for the fare paid and as a redeemable coupon. Below the date the ticket bears the words "Unused transfers good as coupons" as shown at 7. Below this statement as to unused coupons the time intervals are printed as shown at 8.

The face of the ticket is divided into a body part 9, and at its left-hand end into an antemeridian coupon 10 and a postmeridian coupon 11, these coupons bearing the same legends as the corresponding coupons on the back of the ticket, and for the same purpose. At the right-hand end of the ticket in the upper corner thereof is a coupon 12 bearing the legend "No transfer when punched here", the word "here" being arranged in a block indicating that the punching must be through the word "here". This block in which the word "here" is printed corresponds with the blank space 7 on the back of the ticket so that should the ticket be punched from the front or the back the punch hole will be in the proper position and through the word "here" or in the block in which said word is printed. When the coupon transfer ticket is issued as a receipt for a fare paid it is punched as directed by the legend on coupon 12 and its character as a transfer thereby destroyed. The coupon thus issued is of value, however, as it may be redeemed for free tickets when presented in sufficient numbers, in accordance with the agreement printed on the back of the ticket. The face of the ticket bears a list of the transfer points and the usual time limit indications. On the face of the ticket is also printed the notice "Good only for ride when punched at intersecting points and time limit" so that the ticket when it is to be used as a transfer must be punched to indicate the intersecting points and the time limit. If it is for an a. m. transfer the antemeridian coupon must be punched also. If neither the a. m. nor p. m. coupons are punched the ticket is good only for a p. m. transfer.

The conductor when receiving transfers from passengers is required to punch the tickets to convert them into fare receipts and to give them to the passengers in exchange for their transfers. When the tickets are used on a two-fare line when a passenger pays first fare he is given a receipt punched to destroy its character as a transfer and also punched at the point where it is marked "First fare". When he pays his second fare he is given a second receipt similarly punched to destroy its character as a transfer and to convert it into a mere receipt, and also punched at the point where it states "Second fare".

It will thus be seen that there is an absolute check at all times upon the conductor so that he will be at all times able to account for every fare received and transfer given and received.

Having thus fully described my invention, what I claim as new and desire to secure by Letters Patent, is:

1. A coupon transfer ticket consisting of a single sheet provided with time limit and transfer point indications, with appropriately designated postmeridian and antemeridian coupons bearing legends to indicate that if said coupons are punched or not punched the ticket is converted into an antemeridian or postmeridian transfer, respectively, and bearing a legend that the ticket is a redeemable coupon and fare receipt, and further provided with an appropriately designated coupon which if punched destroys the character of the ticket as a transfer and thereby converts it into merely a receipt for the fare paid.

2. A coupon transfer ticket consisting of a single sheet and provided with time limit and transfer point indications, with appropriately designated postmeridian and antemeridian coupons bearing legends to indicate that if said coupons are punched, or not punched, the ticket is converted into an antemeridian or post-meridian transfer, respectively, and bearing in legend that the ticket is a redeemable coupon and fare receipt, and further provided with an appropriately designated coupon which if punched destroys the character of the ticket as a transfer and thereby converts it into merely a receipt for the fare paid and also provided with a plurality of fare indications which when punched indicate how many cash fares have been paid by the holder of the ticket.

In testimony whereof I hereunto affix my signature in the presence of two witnesses.

HENRY BRAUN.

Witnesses:
GEORGE BRANDT,
EDWARD NUGENT.

---

Copies of this patent may be obtained for five cents each, by addressing the "Commissioner of Patents, Washington, D. C."